(12) United States Patent
Agrawal et al.

(10) Patent No.: US 10,827,455 B1
(45) Date of Patent: Nov. 3, 2020

(54) METHOD AND APPARATUS FOR SENDING A NOTIFICATION TO A SHORT-RANGE WIRELESS COMMUNICATION AUDIO OUTPUT DEVICE

(71) Applicant: Motorola Mobility LLC, Chicago, IL (US)

(72) Inventors: Amit Kumar Agrawal, Bangalore (IN); Rachid Alameh, Crystal Lake, IL (US); Zhengping Ji, Hinsdale, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/666,190

(22) Filed: Oct. 28, 2019

(51) Int. Cl.
| | | |
|---|---|---|
| *H04W 68/00* | (2009.01) | |
| *H04W 4/80* | (2018.01) | |
| *H04R 5/033* | (2006.01) | |
| *H04R 1/10* | (2006.01) | |
| *H04W 84/18* | (2009.01) | |

(52) U.S. Cl.
CPC ........ *H04W 68/005* (2013.01); *H04R 1/1016* (2013.01); *H04R 1/1041* (2013.01); *H04R 5/033* (2013.01); *H04W 4/80* (2018.02); *H04R 2420/07* (2013.01); *H04W 84/18* (2013.01)

(58) Field of Classification Search
CPC ..... H04W 68/005; H04W 4/80; H04W 84/18; H04R 1/1016; H04R 1/1041; H04R 5/033; H04R 2420/07
See application file for complete search history.

(56) References Cited

U.S. PATENT DOCUMENTS

| | | | |
|---|---|---|---|
| 6,748,195 B1 | 6/2004 | Phillips | |
| 7,970,350 B2 | 6/2011 | Sheynman et al. | |
| 10,299,300 B1* | 5/2019 | Young | H04W 76/11 |
| 2008/0056472 A1* | 3/2008 | Tanemura | H04M 3/42374 379/201.01 |
| 2010/0075631 A1* | 3/2010 | Black | G07C 9/257 455/410 |
| 2011/0158441 A1* | 6/2011 | Batra | H04R 1/1091 381/311 |
| 2012/0020348 A1* | 1/2012 | Haverinen | H04W 72/1215 370/339 |

(Continued)

*Primary Examiner* — Dinh Nguyen
(74) *Attorney, Agent, or Firm* — Loppnow & Chapa; Matthew C. Loppnow (57) ABSTRACT

An incoming communication can be received. A decision can be made that a short-range wireless communication transceiver is coupled to a plurality of short-range wireless communication audio output devices. The short-range wireless communication audio output devices can include a first short-range wireless communication audio output device and a second short-range wireless communication audio output device. A determination can be made as to which of the first short-range wireless communication audio output device, the second short-range wireless communication audio output device, or both short-range wireless communication audio output devices a notification of the incoming communication should be sent to based on the short-range wireless communication transceiver being coupled to the plurality of short-range wireless communication audio output devices. The notification can be sent to the determined short-range wireless communication audio output device or devices.

18 Claims, 4 Drawing Sheets

(56) References Cited

U.S. PATENT DOCUMENTS

| | | | |
|---|---|---|---|
| 2014/0086438 A1* | 3/2014 | Tachibana | H04R 29/001 381/309 |
| 2015/0181338 A1* | 6/2015 | Hosoi | H04R 1/02 381/309 |
| 2016/0142941 A1* | 5/2016 | Ganesh | H04W 28/20 455/41.2 |

* cited by examiner

METHOD AND APPARATUS FOR SENDING A NOTIFICATION TO A SHORT-RANGE WIRELESS COMMUNICATION AUDIO OUTPUT DEVICE

BACKGROUND

1. Field

The present disclosure is directed to a method and apparatus for sending a notification to a short-range wireless communication audio output device.

2. Introduction

Presently, wireless communication devices communicate with other communication devices using wireless signals. The wireless communication devices communicate with other device using signals over a long-range wireless communication networks, such as Wireless Wide Area Networks (WWANs), over medium-range wireless communication networks, such as Wireless Local Area Networks (WLANs), and over short-range wireless communication networks, such as Personal Area Networks (PANs). Examples of WWANs include satellite communication networks and cellular networks, such as Third Generation Partnership Project (3GPP)-based networks that include Long Term Evolution (LTE) networks and Fifth Generation (5G) New Radio (NR) networks. Examples of PANs include Bluetooth® networks, proprietary short-range wireless communication networks for headphones, infrared-based networks, and other PANs.

For example, current smartphones communicate with other smartphones over LTE networks and communicate with external speakers and headsets using Bluetooth®. Some smartphones communicate with multiple Bluetooth® enabled wireless speakers and wireless headsets. One type of wireless headset is known as a true wireless stereo headset because, not only is there no communication wire between the device and the headset, there is also no communication wire between the left and right earpieces of the headset.

Another feature of current smartphones, personal computers, smart speakers, and other devices is the ability interact with a user using natural language voice commands to implement a hands-fee mode of operation. With a hands-free mode, the user can speak instructions and messages to a device, such as a smartphone, and can have information and notifications on the smartphone read out loud. Users often desire to activate the hands-free mode and use voice commands while driving, while in a specific location, when their smartphone is connected to a wireless headset, and in other scenarios. The hands-free mode can be automatically enabled when the user arrives at a specific location, such as their home, where the smartphone can read notifications, text messages, and other information aloud where the user is comfortable interacting with the smartphone using a touchless interaction mode in the private environment.

When a smartphone or other short-range wireless communication capable device is connected to multiple wireless headsets, the user may wish to share the audio from the smartphone with another person. For example, a husband watching a movie on his smartphone with his wife may use a projector to project the movie on a wall and they can each use a wireless headset to listen to the movie so as to not disturb their children that are sleeping in another room. While watching the movie, the husband may receive a confidential business message. Unfortunately, if hands-free notifications are enabled, the confidential business message would be automatically read aloud and heard by both the husband and wife. Similarly, the husband may receive a confidential business phone call that would be routed to both headsets when answered. This can become more of problem if the husband is watching the movie with multiple friends when receiving confidential communications. Thus, there is a need for an improved method and apparatus for sending a notification to a short-range wireless communication audio output device.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for sending a notification to a short-range wireless communication audio output device. According to a possible embodiment, an incoming communication can be received. A decision can be made that a short-range wireless communication transceiver is coupled to a plurality of short-range wireless communication audio output devices. The short-range wireless communication audio output devices can include a first short-range wireless communication audio output device and a second short-range wireless communication audio output device. A determination can be made as to which of the first short-range wireless communication audio output device, the second short-range wireless communication audio output device, or both short-range wireless communication audio output devices a notification of the incoming communication should be sent to based on the short-range wireless communication transceiver being coupled to the plurality of short-range wireless communication audio output devices. The notification can be sent to the determined short-range wireless communication audio output device or devices.

Figure 1:
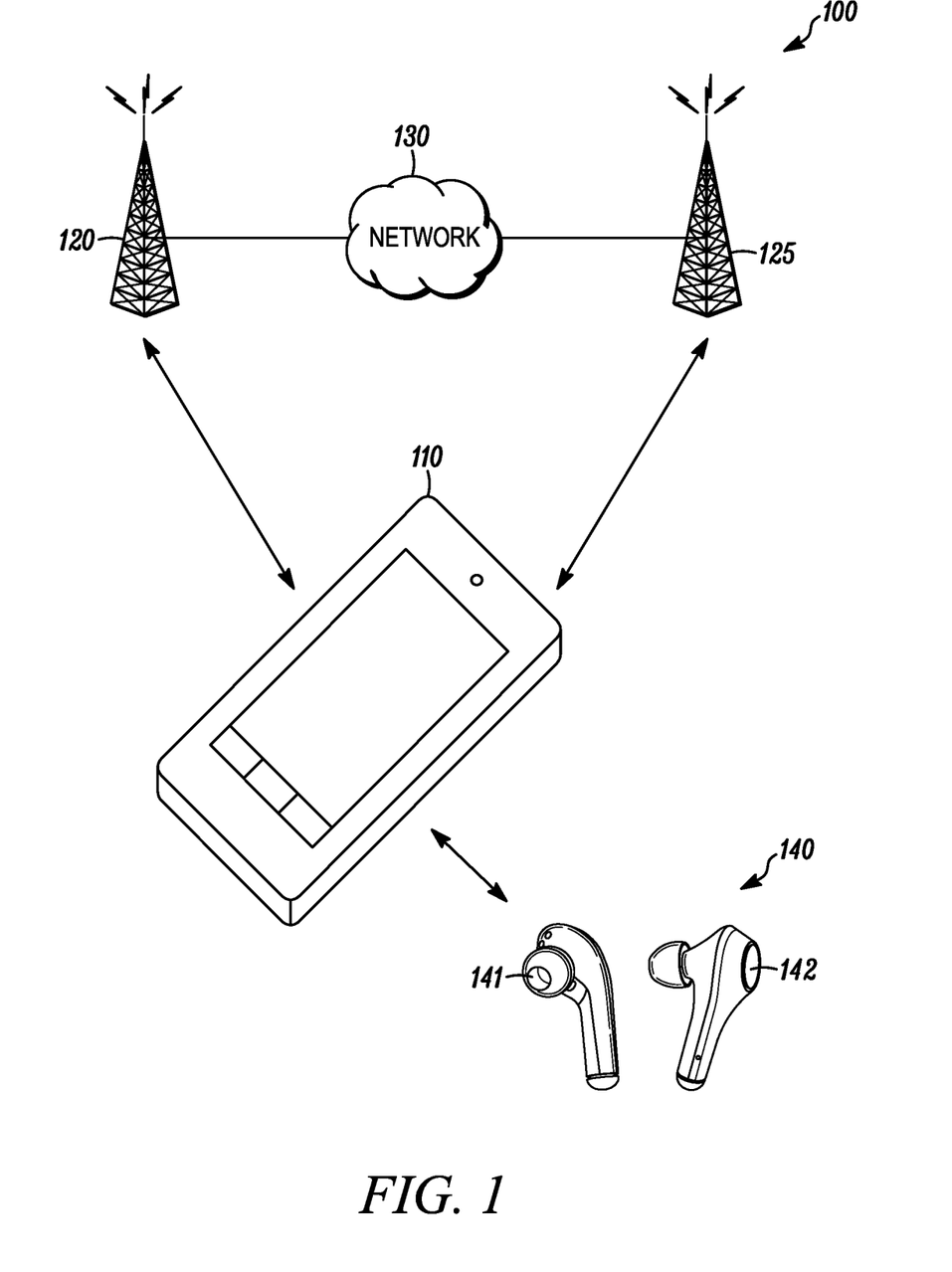
FIG. 1 is an example block diagram of a system according to a possible embodiment.

FIG. 1 is an example block diagram of a system 100 according to a possible embodiment. The system 100 can include a User Equipment (UE) 110, at least one network entity 120 and 125, such as a base station, a network 130, and a plurality of short-range wireless communication audio output devices 140 including a first short-range wireless communication audio output device 141 and a second short-range wireless communication audio output device 142. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network. The plurality of short-range wireless communication audio output devices 140 can include wireless headsets, smart speakers, a true wireless stereo pair of audio output earphones, any other short-range wireless communication audio output device, and/or can be any combination of short-range wireless communication audio output devices. According to a possible embodiment, the short-range wireless communication audio output devices 140 can be true wireless stereo pair of audio output earphones that can include a first wireless audio output earphone 141 and a second wireless audio output earphone 142.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a NR network, a 3GPP-based network, a satellite communications network, a high altitude platform network, the Internet, and/or other communications networks.

In operation, the UE 110 can communicate with the network 130 using long-range and/or medium-range communication signals via at least one network entity 120. For example, the UE 110 can send and receive control signals on a control channel and user data signals on a data channel. The UE 110 can also transmit short-range wireless communication signals, such as PAN signals, to the plurality of short-range wireless communication audio output devices 140. For ease of description in some embodiments, the short-range wireless communication audio output devices 140 can be referred to as PAN devices 140.

Content can be played being played from a single UE 110 and the content can be shared with multiple users, each using one of the PAN devices 140. When the UE 110 is sending audio to multiple PAN devices 140 shared by different users, a decision can be made as to how to send notifications to the PAN devices 140 when communications are received at the UE when a hands-free notification feature is being used. Embodiments can provide for contextually determining the desired recipient, such as the owner of the UE 110, and for routing incoming communications and content only to the owner.

According to a possible embodiment, there can be at least two possible scenarios. A first scenario can be where the PAN devices 140 are true wireless headphones and both PAN devices 140 are being worn by a single user, such as the owner. A second scenario can be when the PAN devices 140 are shared with one user using the first PAN device 141 and another user using the second PAN device 142. The UE 110 can determine the first scenario with both PAN devices 140 by worn by the same user by using an accelerometer in each of the PAN devices 140 to detect similar motion and synchronization of starting and stopping of movement of the PAN devices 140. The UE 110 can also determine the PAN devices 140 are worn by the same user by detecting similar audio levels belonging to the same voice at microphones on each of the PAN devices 140.

The UE 110 can determine the second scenario with each of the PAN devices 140 being worn by separate users by detecting different audio levels of a voice of a same user at each of the PAN devices 140. For example, the UE 110 can detect stronger voice levels of one user at one PAN device 141 than at the other PAN device 142, such as when the user is speaking during content playback. The UE 110 can accordingly determine the PAN devices 140 are being shared, identify the owner based on speech recognition, voice identification, voice tone, contextual phrases, etc., and route notifications to the PAN device 141 that the owner is wearing. For example, the UE 110 can use the context of the owner saying a phrase such as, "Hey, listen to this," being louder at one PAN device 141, which can indicate the owner is using the PAN device 141 and sharing the other PAN device 142 with another user.

As another example of the second scenario, when the owner of the UE 110 is listening to music via both PAN devices 140 and an incoming call comes in, the owner might want another user to hear the call. The owner can take one PAN device 142 off their ear and give it to the other user. The disruption of the PAN device 142 leaving the owner's ear to attach to the other person's ear, which can be determined via a wearability sensor on the PAN device 142, can indicate which PAN device 142 is the borrowed PAN device and which PAN device 141 is still being worn by the owner. The UE 110 can then route future notifications, such as messages and calls, to the PAN device 141.

As another example of the second scenario, the owner of the UE 110 can tend to have a preference, if given a choice, for using one of the PAN devices 140 on their corresponding right or left ear, when giving the other out the other for sharing or otherwise when deciding to wear only one of the PAN devices 140. This information can be captured and then stored in usage history in a memory. Also, an owner aware of this feature can lend the appropriate other PAN device when sharing content. For example, if the UE 110 determines the owner prefers wearing the PAN device 141 corresponding to their right ear and the owner lends the PAN device 142 corresponding to the left ear to another user, incoming calls can be routed to the PAN device 141 corresponding to the right ear.

There can be other ways of determining the sharing state of the PAN devices 140 and association of one of the PAN devices 140 with the owner. One way can include turning on a camera on the UE 110 when different users are wearing each of the PAN devices 140. The camera can then determine which PAN device the owner is wearing based on facial recognition, based on which user is holding the UE 110, based on identification of a PAN device, and/or based on other visual information. The camera can also be used by turning it on every time the UE 110 engages with a PAN device and when sensors on the UE 110 are triggered, such as by using volume knobs, touch screens, app engagement to change music, and other triggers on the UE 110. The camera can also confirm the owner's voice by capturing an image or video of the user holding and/or controlling the UE 110 and by matching audio capture with lip movement. The camera can also be used to determine which user is in front of the UE 110 and wearing a particular PAN device. For example, the UE 110 can check for one or more PAN devices 140 tied to, such as paired with, the UE 110. If one PAN device 141 or one stereo pair of PAN devices 140 is tied to the UE 110, a notification can be directly routed to the relevant PAN device(s). If more than one PAN device is tied to the UE 110, the camera can be launched and the UE 110 can assess which user or PAN device is in front of the UE 110 and send a notification to the corresponding user/PAN device because the owner is more likely to be holding the UE 110.

There can also be various modes of determining if the PAN devices 140 are shared. One mode can be a manual mode where a user can manually define and confirm the sharing status when one PAN device is shared. For example, the user can double tap an earpiece on the PAN device 141 to confirm the one is in user's ear is the owner's device and the other one is shared. After receiving the tapping signal, the UE 110 can know which PAN device to send notifications to. Another mode can be a voice mode where the user can authorize a PAN device via voice commands when one of the PAN devices 140 is shared. The authorization message can be implicit, such as "I give the left one to you" or "I keep the right one." The UE 110 and or one or both of the PAN devices 140 can listen and recognize the user's voice to establish sharing mode and determine which one is shared. Yet another mode can be a contextual mode where PAN device sharing can be determined by various contexts described in some or all of the disclosed embodiments. Also, another mode can be a fingerprint mode where the PAN devices 140 can include fingerprint sensors. Thus, when the non-owner uses a PAN device and touches the fingerprint sensor, the PAN device and/or the UE 110 can know that it is not the owner's ear and it is thus the shared PAN device. Another possible implementation can be where a fingerprint sensor can verify the owner's fingerprint and determine the corresponding PAN device is being worn by the owner.

Figure 2:
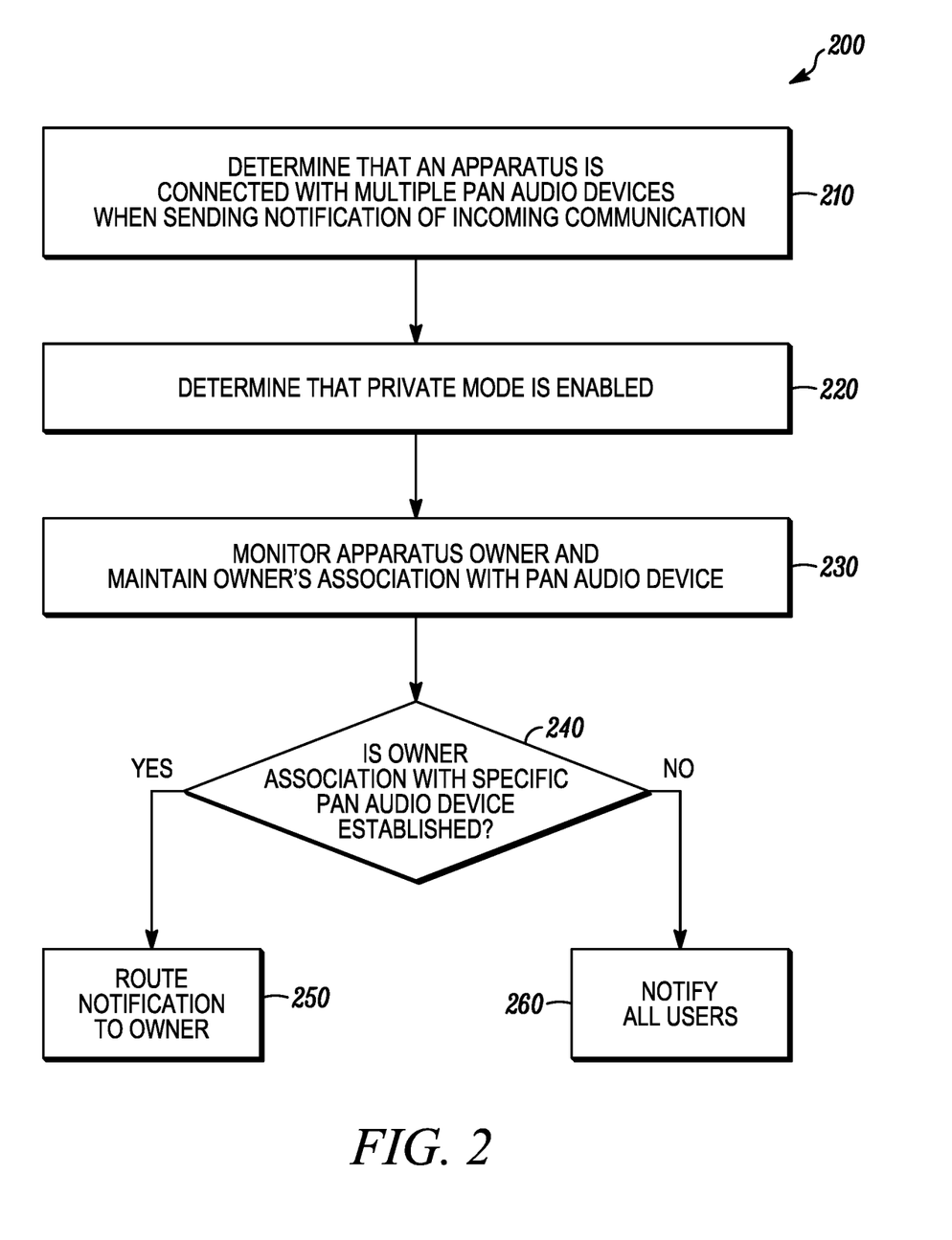
FIG. 2 is an example flowchart illustrating the operation of an apparatus according to a possible embodiment.

FIG. 2 is an example flowchart 200 illustrating operation of an apparatus, such as the UE 110, according to a possible embodiment. At 210, a determination can be made that the apparatus is connected with multiple PAN audio devices, such as the PAN devices 140, when sending a notification of incoming communications. For example, a determination can be made of a shared state of the PAN devices 140 when audio readout of incoming communications would be announced upon the arrival of the communications. At 220, a determination can be made that a private mode is enabled and to accordingly route incoming communications only to the owner of the apparatus. At 230, the apparatus owner can be monitored and the owner's association with a particular PAN device 141 can be maintained. This can be done using at least one of the modes listed above, such as the manual mode, voice mode, contextual mode, fingerprint mode, and/or other useful modes. At 240, a determination can be made as to whether the owner's association with a specific PAN device has been established. If it has been established, at 250, incoming notifications, such as communications and content, can be routed only to the PAN device the owner is using. Optionally, content that is currently being played can be paused or continued on the other PAN devices. In an embodiment where the PAN devices are connected speakers, the apparatus can announce any notifications only to the speaker that the owner is the nearest to. If the owner's association with a specific PAN device has not been established when an incoming communication is received, at 260, all users can be notified that an incoming communication is being received and they can be prompted for feedback. The feedback can be authenticated for ownership association and the communications can be routed only to the owner.

Figure 3:
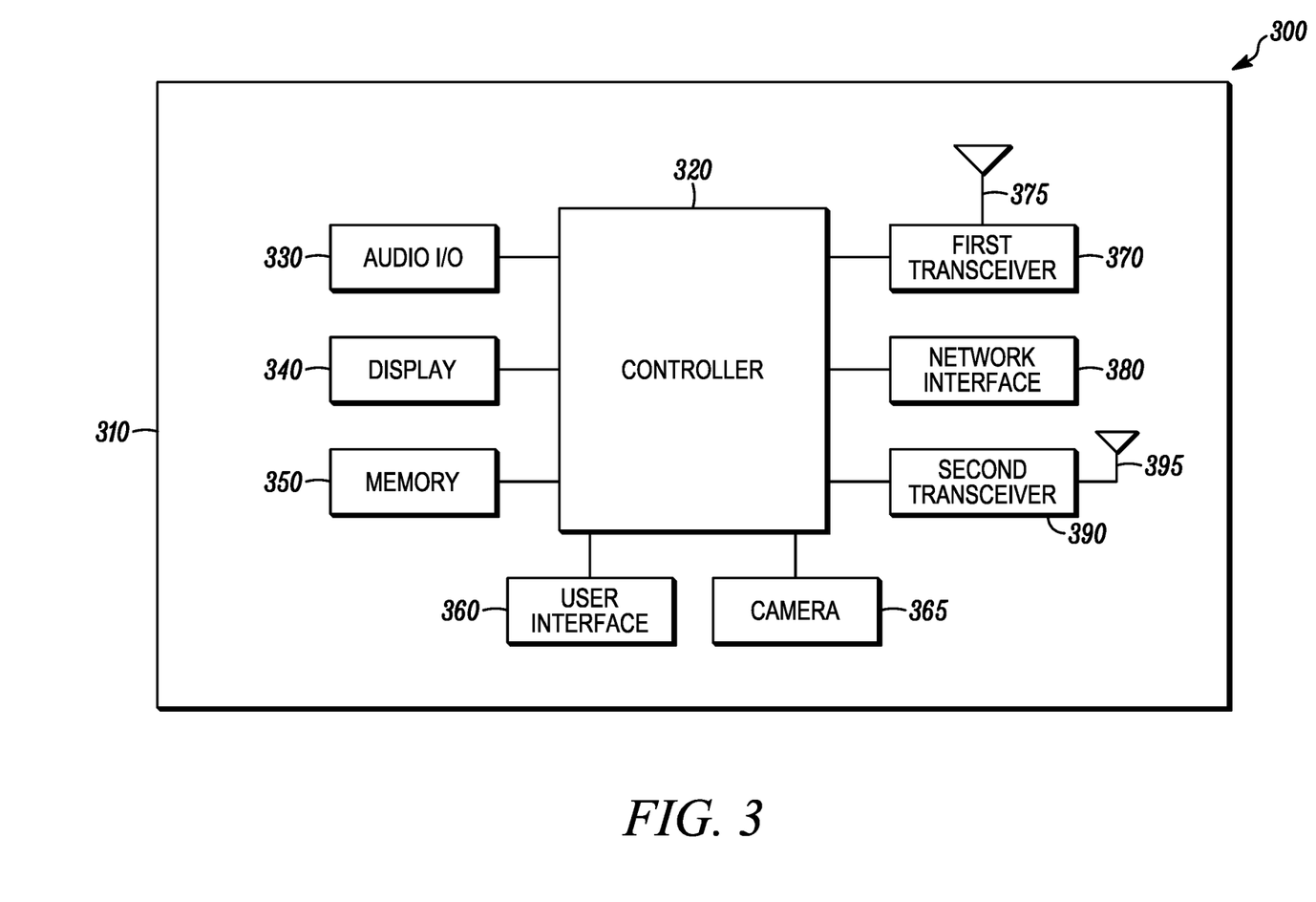
FIG. 3 is an example block diagram of an apparatus according to a possible embodiment.

FIG. 3 is an example block diagram of an apparatus 300, such as the UE 110, the network entity 120, one of the short-range wireless communication audio output devices 140, or any other wireless communication device disclosed herein, according to a possible embodiment. The apparatus 300 can include a housing 310, a controller 320 coupled to the housing 310, audio input and output circuitry 330 coupled to the controller 320, a display 340 coupled to the controller 320, a memory 350 coupled to the controller 320, a user interface 360 coupled to the controller 320, at least one camera 365 coupled to the controller 320, a first transceiver 370 coupled to the controller 320, at least one first antenna 375 coupled to the first transceiver 370, a network interface 380 coupled to the controller 320, a second transceiver 390 coupled to the controller 320, and at least one second antenna 395 coupled to the second transceiver 390. The apparatus 300 may not necessarily include all of the illustrated elements for different embodiments of the present disclosure. The apparatus 300 can perform the methods described in all the embodiments.

The display 340 can be a viewfinder, a Liquid Crystal Display (LCD), a Light Emitting Diode (LED) display, an Organic Light Emitting Diode (OLED) display, a plasma display, a projection display, a touch screen, or any other device that displays information. The first transceiver 370 and/or the second transceiver 390 can be one or more transceivers that can include a transmitter and/or a receiver. The first transceiver 370 can be a long-range communication transceiver and the second transceiver 390 can be a short-range wireless communication transceiver.

The audio input and output circuitry 330 can include a microphone, a speaker, a transducer, or any other audio input and output circuitry. The user interface 360 can include a keypad, a keyboard, buttons, a touch pad, a joystick, a touch screen display, another additional display, or any other device useful for providing an interface between a user and an electronic device. The network interface 380 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 350 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 300 or the controller 320 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 350, elsewhere on the apparatus 300, in cloud storage, and/or anywhere else that can store software and/or an operating system. The apparatus 300 or the controller 320 may also use hardware to implement disclosed operations. For example, the controller 320 may be any programmable processor. Furthermore, the controller 320 may perform some or all of the disclosed operations. For example, some operations can be performed using cloud computing and the controller 320 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 320 may be any controller or processor device or devices capable of operating an apparatus and implementing the disclosed embodiments. Some or all of the additional elements of the apparatus 300 can also perform some or all of the operations of the disclosed embodiments.

In operation, the apparatus 300 can perform the methods and operations of the disclosed embodiments. The first transceiver 370 can transmit and receive signals, including control signals and data signals and including information, such as control and data information. The controller 320 can generate and process the transmitted and received signals and information.

According to a possible embodiment, the transceiver 370 can be a long-range communication transceiver that can send and receive long-range communication signals. According to different embodiments, the long-range communication transceiver 370 can be a wide area network transceiver, such as a wireless wide area network transceiver, a cellular network transceiver, a 3GPP-based network transceiver, a transceiver that communicates directly or indirectly over the Internet, an Ethernet port, or any other long-range communication transceiver 370.

The transceiver 390 can be a short-range wireless communication transceiver 390 that can transmit short-range wireless communication signals to a plurality of short-range wireless communication audio output devices, such as the PAN devices 140. The plurality of short-range wireless communication audio output devices can include a first short-range wireless communication audio output device and a second short-range wireless communication audio output device. A short-range wireless connection for transmitting the signals can be a connection that communicates directly between portable wireless communication devices, a personal area network connection, a Bluetooth®-type wireless connection, an IEEE 802.15.1 wireless connection, short-wavelength UHF radio wave connection, a wireless connection in a 2/4 GHz band, such as in frequency bands 2.400 to 2.585 GHz, or any other short-range wireless connection that can transmit audio and/or other notification signals to a client device. A portable wireless communication device can be a device that includes an autonomous power supply, such as a battery, that can be carried by a person, and that can communicate with other devices by using wireless communication signals.

The controller 320 can receive an incoming communication via the long-range communication transceiver 370. The controller 320 can decide that the short-range wireless communication transceiver 390 is coupled to the plurality of short-range wireless communication audio output devices.

The controller 320 can determine which of at least one selected from the first short-range wireless communication audio output device and the second short-range wireless communication audio output device a notification of the incoming communication should be sent to based on the short-range wireless communication transceiver 390 being coupled to the plurality of short-range wireless communication audio output devices.

The controller 320 can send the notification to the determined at least one selected from the first short-range wireless communication audio output device and the second short-range wireless communication audio output device. The notification can be sent to one or both of the audio output devices. For example, the controller 320 can control which earphone of true wireless stereo earphones receives the notification via a Bluetooth hardware layer, via a device framework layer, via an application layer, or by any other way of controlling which earphone receives the notification.

According to a possible embodiment, the plurality of short-range wireless communication audio output devices can be a true wireless stereo pair of audio output earphones. The true wireless stereo pair of audio output earphones can include a first wireless audio output earphone including a first short-range wireless transceiver and a second wireless audio output earphone including a second short-range wireless transceiver. The controller 320 can determine that the plurality of short-range wireless communication audio output devices are a true wireless stereo pair of audio output earphones, such as when the earphones register with the apparatus 300, when the earphones are paired with the apparatus 300, based on information received from the earphones, and/or otherwise determine that the plurality of short-range wireless communication audio output devices are a true wireless stereo pair of audio output earphones. The wireless output earphones can receive wireless communication signals via the short-range wireless communication transceiver 390 and can output audio signals based on the received wireless communication signals. The controller 320 can determine that the short-range wireless communication transceiver 390 is coupled to the true wireless stereo pair of audio output earphones.

A true wireless stereo pair of audio output earphones can also be known as true wireless earphones and can provide stereo audio signals without requiring a communication wire between each earphone of the stereo pair. Some true wireless earphones can fit within a user's ears and can be known as earpods, earbuds, wireless in-ear monitors, and other names. Other true wireless earphones can extend around the ear to keep them securely in place. The true wireless earphones can communicate separate wireless communication signals by each establishing separate a short-range wireless communication link with the short-range wireless communication transceiver 390. For example, the short-range wireless communication transceiver 390 can establish a first short-range wireless communication link with the first true wireless earphone and the short-range wireless communication transceiver 390 can establish a second short-range wireless communication link with the second true wireless earphone. According to this example, each earphone can independently connect to the apparatus 300 and operate independently of each other. According to another possible example, the short-range wireless communication transceiver 390 can establish a short-range wireless communication link with one true wireless earphone, which can send wireless communication signals to the other true wireless earphone via a separate wireless communication link. According to this example, only one of the earphones may connect to the apparatus 300 and the other earphone may communicate directly with the connected earphone instead of communicating with the apparatus 300.

According to a possible embodiment, the controller 320 can determine a sharing state between a first sharing state and a second sharing state of the true wireless stereo pair of audio output earphones. The first sharing state can be a state where both the first and second wireless audio output earphones being worn by a same user. The second sharing state can be a state where the first wireless audio output earphone is being worn by a different user than a user wearing the second wireless audio output earphone. The controller 320 can determine whether the notification of the incoming communication should be sent to either the first wireless audio output earphone or the second wireless audio output earphone based on the determined sharing state.

The controller 320 can determine the sharing state is the first sharing state based on similar motion of both of the first and second wireless audio output earphones. The controller 320 can also determine the sharing state is the first sharing state based on similar voice audio levels belonging to the same voice being received by microphones on the first and second wireless audio output earphones. As an example for similar motion, both the first and second wireless audio output earphones can include accelerometers and the controller 320 can detect signals from the accelerometers received via the short-range wireless communication transceiver 390, where the signals can correspond to similar motion of both of the first and second wireless audio output earphones. As a further example, the signals can indicate the first and second wireless audio output earphones start and stop motion at the same time, which can indicate both the first and second wireless audio output earphones are being worn by a same user. As an example for similar audio, both the first and second wireless audio output earphones can include microphones and the controller 320 can detect audio signals corresponding to the microphones received via the short-range wireless communication transceiver 390. Similar voice audio levels can comprise voice audio levels within a predetermined range of voice audio levels. For example, a voice audio level of voice received on a microphone of the first earphone can be within an audio level threshold amount of a voice audio level of the same voice received on a microphone of the second earphone.

The controller 320 can determine the sharing state is the second sharing state based on different voice levels of a same user being detected at each of the wireless audio output earphones. For example, different voice levels of each user are heard via a microphone at a given earphone. The controller 320 can determine which user is the owner between the two voices based on voice identification, voice authentication, speech patterns, voice tonality, or other ways of identifying a user. The determination can be text dependent, such as triggered with a specific word, and/or can be text independent, such as passive and always on.

According to a possible embodiment, the controller 320 can determine both wireless audio output earphones are being worn concurrently. The controller 320 can detect the second wireless audio output earphone has been removed and then re-worn while the first wireless audio output earphone is continuously worn. The controller 320 can determine the first wireless audio output earphone is being worn by a different user than a user wearing the second wireless audio output earphone based on detecting the second wireless audio output earphone has been removed and then re-worn while the first wireless audio output earphone is concurrently worn. The controller 320 can determine the notification should be sent to the first wireless audio output earphone based on determining the second wireless audio output earphone has been removed and then re-worn while the first wireless audio output earphone is continuously worn. For example, when a husband is listening to music via both headsets and an incoming call comes in, husband may want their wife to hear the message. The husband can take one headset off his ear and give it to his wife. The disruption of the headset leaving the husband's ear to attach to the wife's ear, which can be determined via a wearability sensor, can indicate which headset is the borrowed headset and which headset, such as the one that did not experience wearability disruption, belongs to owner where future notifications can be routed to. Also, various combinations determinations can be made to determine which user wears which earphone. For example, a user may remove and re-wear one of the earphones while the other is worn continuously, which may require additional information to determine whether the earphones are shared or not. Therefore, determinations of other embodiments can also be used to assist in determining a sharing state and determining where the notification should be sent.

According to a possible embodiment, the controller 320 can determine a preference of an owner of the apparatus 300 for wearing one of the wireless audio output earphones over the other of the wireless audio output earphones. The controller 320 can determine the notification should be sent to the preferred wireless audio output earphone based on determining the preference of the owner of the apparatus 300. For example, an owner may tend to have a preference, if given a choice, for wearing an earphone on right or left ear. If the owner gives out the other for sharing, the knowledge of the owner's preference can be captured via prior history, or an owner aware of this feature can lend the non-preferred earphone. In particular, if the owner likes the right ear earphone, the owner can lend the left ear earphone to another and incoming calls and notifications can come to the right ear earphone. According to a possible implementation, the history of the owners preferred ear for earphone usage can be stored in the memory 350 of the apparatus 300 and the owner's preference can be determined from the history.

According to a possible embodiment, the camera 365 can capture an image. The controller 320 can determine which one of the short-range wireless communication audio output devices is being used by an intended recipient of the incoming communication based on the captured image. The controller 320 can send the notification to the short-range wireless communication audio output device being used by the intended recipient. The image can be a still image or can be at least one image in a sequence of video images. The camera 365 can also employ a depth sensor that can be used by the controller 320 to make its determinations. The intended recipient can be the owner of the apparatus 300, can be a user registered with the apparatus 300, can be a user selected to receive communications received at the apparatus 300, or can be any other intended recipient. According to a possible implementation, the captured image can show which person is holding the device and the controller 320 can match audio received via a microphone with the person's lip movement. The controller 320 can determine which headset the person is wearing by using the camera 365 to distinguish between, for example, a left headphone and a right headphone.

According to another possible embodiment, the short-range wireless communication audio output devices can include fingerprint readers. The controller 320 can detect a fingerprint received on the first short-range wireless communication audio output device. The fingerprint can identify the intended recipient of the incoming communication. The controller 320 can determine the notification of the incoming communication should be sent on the first short-range wireless communication audio output device based on the fingerprint identifying the intended recipient of the incoming communication.

According to another possible embodiment, the controller 320 can detect an audible input indicating the notification should be sent on the first short-range wireless communication audio output device. The controller 320 can detect the audible input via a microphone on one of the short-range wireless communication audio output devices, via a microphone on the apparatus 300, or via any other means. The controller 320 can determine the notification of the incoming communication should be sent on the first short-range wireless communication audio output device based on the audible input. It should be noted that the first short-range wireless communication audio output device is being used here as an example only to distinguish between which audio output device a notification is sent to and is not otherwise intended to indicate a particular device between the first and second short-range wireless communication audio output devices.

As an example of user inputs, the controller 320 can detect a user input indicating a sharing status of the plurality of short-range wireless communication audio output devices. The controller 320 can then determine whether a notification of the incoming communication should be sent to either the first short-range wireless communication audio output device or the second short-range wireless communication audio output device based on the user input indicating a sharing status of the plurality of short-range wireless communication audio output devices. As a further example, the user input can be received on a user interface of the apparatus 300, on a user interface of at least one of the plurality of short-range wireless communication audio output devices, on another device coupled to the apparatus 300, or by any other means. The user interface can be a touch interface of the user interface 350, a microphone of the audio input and output circuitry 330, the camera 365, or any other user interface on the apparatus 300 or a similar interface on a short-range wireless communication audio output device. As a further example, the controller 320 can ascertain the user input was received on a user input of the first short-range wireless communication audio output device. The controller 320 can then determine the notification of the incoming communication should be sent on the first short-range wireless communication audio output device based on ascertaining the user input was received on the user input of the first short-range wireless communication audio output device.

Figure 4:
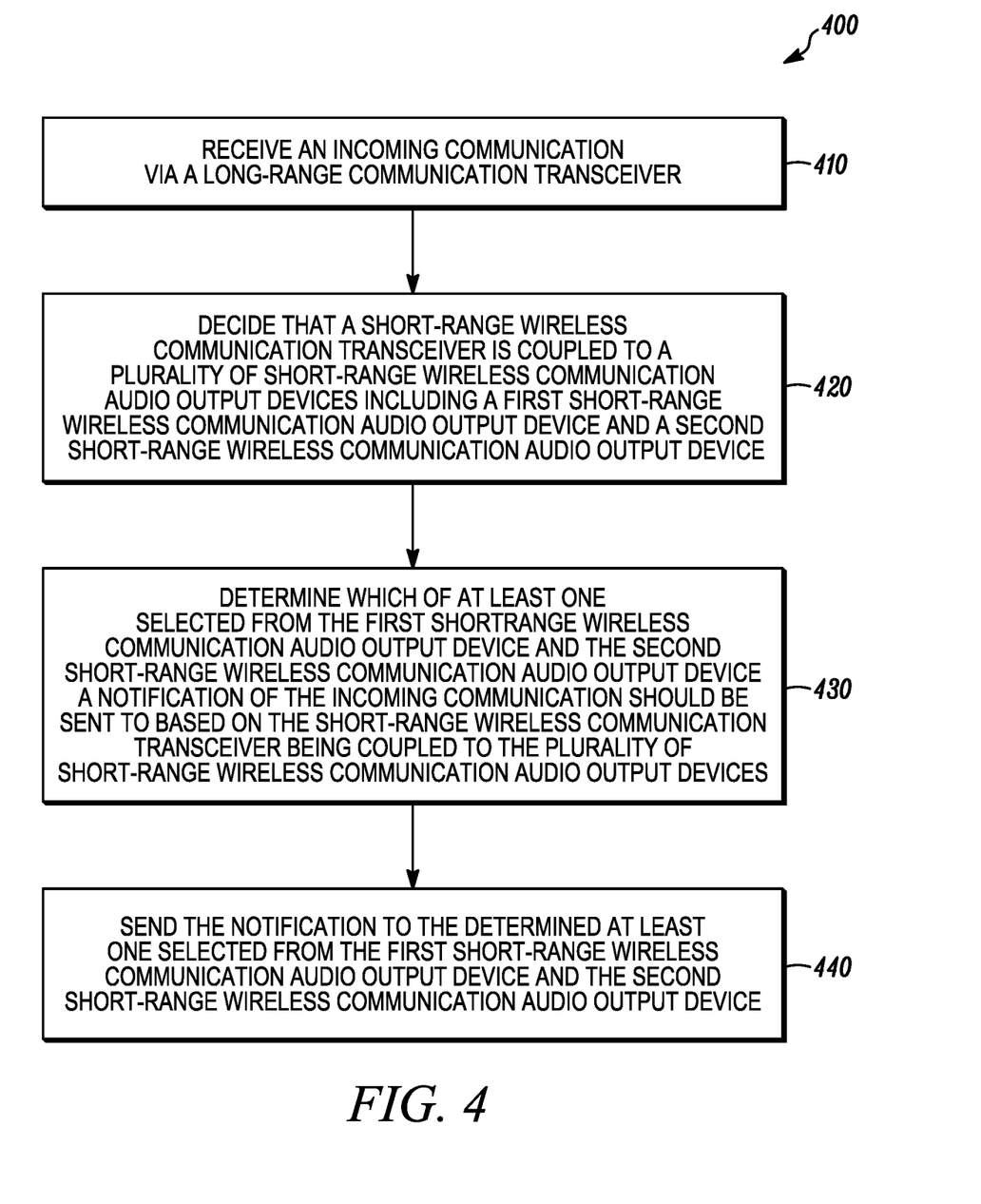
FIG. 4 is an example flowchart illustrating the operation of an apparatus according to a possible embodiment.

FIG. 4 is an example flowchart 400 illustrating the operation of a wireless communication device, such as the UE 110, according to a possible embodiment. It should be noted that different or multiple operations of the recited operations can be performed in a same operation, such as in one operation and/or a same process. At 410, an incoming communication can be received via a long-range communication transceiver. At 420, a decision can be made that a short-range wireless communication transceiver is coupled to a plurality of short-range wireless communication audio output devices. The short-range wireless communication audio output devices can include a first short-range wireless communication audio output device and a second short-range wireless communication audio output device. At 430, a determination can be made as to which of the first short-range wireless communication audio output device, the second short-range wireless communication audio output device, or both short-range wireless communication audio output devices a notification of the incoming communication should be sent to based on the short-range wireless communication transceiver being coupled to the plurality of short-range wireless communication audio output devices. At 440, the notification can be sent to the determined short-range wireless communication audio output device or devices.

According to a possible embodiment, the plurality of plurality of short-range wireless communication audio output devices comprise a true wireless stereo pair of audio output earphones. The true wireless stereo pair of audio output earphones can include a first wireless audio output earphone including a first short-range wireless transceiver and a second wireless audio output earphone including a second short-range wireless transceiver.

According to a possible embodiment, a sharing state can be determined between a first sharing state and a second sharing state of the true wireless stereo pair of audio output earphones. The first sharing state can be a state where both the first and second wireless audio output earphones are being worn by a same user. The second sharing state can be a state where the first wireless audio output earphone is be worn by a different user than a user wearing the second wireless audio output earphone. A determination can be made as to whether the notification of the incoming communication should be sent to either the first wireless audio output earphone or the second wireless audio output earphone based on the determined sharing state.

According to a possible embodiment, determining a sharing state can include determining the sharing state is the first sharing state based on similar motion of both of the first and second wireless audio output earphones and/or based on similar voice audio levels belonging to the same voice being received by microphones on the first and second wireless audio output earphones. According to a possible embodiment, determining the sharing state can include determining the sharing state is the second sharing state based on different voice levels of a same user being detected at each of the wireless audio output earphones.

According to a possible embodiment, a determination can be made that both wireless audio output earphones are being worn concurrently. A detection can be made of the second wireless audio output earphone having been removed and then re-worn while the first wireless audio output earphone is continuously worn. A determination can be made that the first wireless audio output earphone is being worn by a different user than a user wearing the second wireless audio output earphone based on detecting the second wireless audio output earphone has been removed and then re-worn while the first wireless audio output earphone is concurrently worn. A determination can be made that the notification should be sent to the first wireless audio output earphone based on determining the second wireless audio output earphone has been removed and then re-worn while the first wireless audio output earphone is continuously worn.

According to a possible embodiment, a determination can be made of a preference of an owner of the apparatus for wearing one of the wireless audio output earphones over the other of the wireless audio output earphones. A determination can be made that the notification should be sent to the preferred wireless audio output earphone based on determining the preference of the owner of the apparatus.

According to a possible embodiment, an image can be captured via a camera. A determination can be made as to which one of the short-range wireless communication audio output devices is being used by an intended recipient of the incoming communication based on the captured image. The notification can be sent to the short-range wireless communication audio output device being used by the intended recipient.

According to a possible embodiment, a fingerprint received on the first short-range wireless communication audio output device can be detected. The fingerprint can identify the intended recipient of the incoming communication. A determination can be made that the notification of the incoming communication should be sent on the first short-range wireless communication audio output device based on the fingerprint identifying the intended recipient of the incoming communication.

According to a possible embodiment, an audible input can be detected. The audible input can indicate the notification should be sent on the first short-range wireless communication audio output device. A determination can be made the notification of the incoming communication should be sent on the first short-range wireless communication audio output device based on the audible input.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

At least some embodiments can detect the owner of a device and route incoming communications accordingly. At least some embodiments can also enable a private mode in response to determining that a device is being shared by a set of connected wireless audio devices by more than one person where the owner of the device can be contextually determined and incoming communications/content can be routed only to the owner.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
    a long-range communication transceiver that sends and receives long-range communication signals;
    a short-range wireless communication transceiver that transmits short-range wireless communication signals to a plurality of short-range wireless communication audio output devices including a first short-range wireless communication audio output device and a second short-range wireless communication audio output device;
    a controller coupled to the short-range wireless communication transceiver and the long-range communication transceiver, where the controller
        receives an incoming communication via the long-range communication transceiver,
        decides that the short-range wireless communication transceiver is coupled to the plurality of short-range wireless communication audio output devices;
        determines which of at least one selected from the first short-range wireless communication audio output device and the second short-range wireless communication audio output device a notification of the incoming communication should be sent to
            based on the short-range wireless communication transceiver being coupled to the plurality of short-range wireless communication audio output devices, and
        sends the notification to the determined at least one selected from the first short-range wireless communication audio output device and the second short-range wireless communication audio output device,
    wherein the controller
        determines a sharing state between a first sharing state and a second sharing state of the true wireless stereo pair of audio output earphones,
        where the first sharing state comprises both the first and second wireless audio output earphones being worn by a same user, and
        where the second sharing state comprises the first wireless audio output earphone being worn by a different user than a user wearing the second wireless audio output earphone, and
        determines whether the notification of the incoming communication should be sent to either the first wireless audio output earphone or the second wireless audio output earphone based on the determined sharing state.

2. The apparatus according to claim 1, wherein the plurality of short-range wireless communication audio output devices comprise a true wireless stereo pair of audio output earphones, where the true wireless stereo pair of audio output earphones comprise
    a first wireless audio output earphone including a first short-range wireless transceiver; and a second wireless audio output earphone including a second short-range wireless transceiver.

3. The apparatus according to claim 1, wherein the controller determines the sharing state is the first sharing state based on at least one selected from
similar motion of both of the first and second wireless audio output earphones, and
similar voice audio levels belonging to the same voice being received by microphones on the first and second wireless audio output earphones.

4. The apparatus according to claim 1, wherein the controller determines the sharing state is the second sharing state based on different voice levels of a same user being detected at each of the wireless audio output earphones.

5. The apparatus according to claim 2, wherein the controller
determines both wireless audio output earphones are being worn concurrently,
detects the second wireless audio output earphone has been removed and then re-worn while the first wireless audio output earphone is continuously worn,
determines the first wireless audio output earphone is being worn by a different user than a user wearing the second wireless audio output earphone based on detecting the second wireless audio output earphone has been removed and then re-worn while the first wireless audio output earphone is concurrently worn, and
determines the notification should be sent to the first wireless audio output earphone based on determining the second wireless audio output earphone has been removed and then re-worn while the first wireless audio output earphone is continuously worn.

6. The apparatus according to claim 2, wherein the controller
determines a preference of an owner of the apparatus for wearing one of the true wireless stereo pair of audio output earphones over the other of the true wireless stereo pair of audio output earphones, and
determines the notification should be sent to the preferred wireless audio output earphone based on determining the preference of the owner of the apparatus.

7. The apparatus according to claim 1, further comprising a camera coupled to the controller, where the camera captures an image,
wherein the controller
determines which one of the short-range wireless communication audio output devices is being used by an intended recipient of the incoming communication based on the captured image, and
sends the notification to the short-range wireless communication audio output device being used by the intended recipient.

8. The apparatus according to claim 1, wherein the controller
detects a fingerprint received on the first short-range wireless communication audio output device, where the fingerprint identifies the intended recipient of the incoming communication, and
determines the notification of the incoming communication should be sent on the first short-range wireless communication audio output device based on the fingerprint identifying the intended recipient of the incoming communication.

9. The apparatus according to claim 1, wherein the controller
detects an audible input indicating the notification should be sent on the first short-range wireless communication audio output device, and
determines the notification of the incoming communication should be sent on the first short-range wireless communication audio output device based on the audible input.

10. A method comprising:
receiving an incoming communication via a long-range communication transceiver;
deciding that a short-range wireless communication transceiver is coupled to a plurality of short-range wireless communication audio output devices including a first short-range wireless communication audio output device and a second short-range wireless communication audio output device;
determining which of the first short-range wireless communication audio output device, the second short-range wireless communication audio output device, or both short-range wireless communication audio output devices a notification of the incoming communication should be sent to based on the short-range wireless communication transceiver being coupled to the plurality of short-range wireless communication audio output devices; and
sending the notification to the determined short-range wireless communication audio output device or devices,
wherein the method further comprises:
determining a sharing state between a first sharing state and a second sharing state of the true wireless stereo pair of audio output earphones,
where the first sharing state comprises both the first and second wireless audio output earphones being worn by a same user, and
where the second sharing state comprises the first wireless audio output earphone being worn by a different user than a user wearing the second wireless audio output earphone; and
determining whether the notification of the incoming communication should be sent to either the first wireless audio output earphone or the second wireless audio output earphone based on the determined sharing state.

11. The method according to claim 10, wherein the plurality of plurality of short-range wireless communication audio output devices comprise a true wireless stereo pair of audio output earphones, where the true wireless stereo pair of audio output earphones comprise
a first wireless audio output earphone including a first short-range wireless transceiver, and
a second wireless audio output earphone including a second short-range wireless transceiver.

12. The method according to claim 10, wherein
determining a sharing state comprises determining the sharing state is the first sharing state based on at least one selected from
similar motion of both of the first and second wireless audio output earphones, and
similar voice audio levels belonging to the same voice being received by microphones on the first and second wireless audio output earphones.

13. The method according to claim 10, wherein determining the sharing state comprises determining the sharing state is the second sharing state based on different voice levels of a same user being detected at each of the wireless audio output earphones.

14. The method according to claim 11, further comprising
determining both wireless audio output earphones are being worn concurrently;
detecting the second wireless audio output earphone has been removed and then re-worn while the first wireless audio output earphone is continuously worn;
determining the first wireless audio output earphone is being worn by a different user than a user wearing the second wireless audio output earphone based on detecting the second wireless audio output earphone has been removed and then re-worn while the first wireless audio output earphone is concurrently worn; and
determining the notification should be sent to the first wireless audio output earphone based on determining the second wireless audio output earphone has been removed and then re-worn while the first wireless audio output earphone is continuously worn.

15. The method according to claim 11, further comprising:
determining a preference of an owner of the apparatus for wearing one of the true wireless stereo pair of audio output earphones over the other of the true wireless stereo pair of audio output earphones; and
determining the notification should be sent to the preferred wireless audio output earphone based on determining the preference of the owner of the apparatus.

16. The method according to claim 10, further comprising:
capturing an image via a camera;
determining which one of the short-range wireless communication audio output devices is being used by an intended recipient of the incoming communication based on the captured image; and
sending the notification to the short-range wireless communication audio output device being used by the intended recipient.

17. The method according to claim 10, further comprising:
detecting a fingerprint received on the first short-range wireless communication audio output device, where the fingerprint identifies the intended recipient of the incoming communication; and
determining the notification of the incoming communication should be sent on the first short-range wireless communication audio output device based on the fingerprint identifying the intended recipient of the incoming communication.

18. The method according to claim 10, further comprising:
detecting an audible input indicating the notification should be sent on the first short-range wireless communication audio output device; and
determining the notification of the incoming communication should be sent on the first short-range wireless communication audio output device based on the audible input.

* * * * *